United States Patent
Haselhuhn, Jr.

(10) Patent No.: US 12,474,414 B2
(45) Date of Patent: Nov. 18, 2025

(54) SYSTEM AND METHOD TO MONITOR POWER SOURCE CONNECTIONS

(71) Applicant: Allegro MicroSystems, LLC, Manchester, NH (US)

(72) Inventor: Howard J. Haselhuhn, Jr., Brighton, MI (US)

(73) Assignee: Allegro MicroSystems, LLC, Manchester, NH (US)

( * ) Notice: Subject to any disclaimer, the term of this patent is extended or adjusted under 35 U.S.C. 154(b) by 154 days.

(21) Appl. No.: 18/404,172

(22) Filed: Jan. 4, 2024

(65) Prior Publication Data
US 2025/0224458 A1    Jul. 10, 2025

(51) Int. Cl.
G01R 31/40    (2020.01)
G01R 15/20    (2006.01)

(52) U.S. Cl.
CPC ............. *G01R 31/40* (2013.01); *G01R 15/20* (2013.01)

(58) Field of Classification Search
CPC ................................ G01R 31/40; G01R 15/20
USPC .................................. 324/764.01, 537, 500
See application file for complete search history.

(56) References Cited

U.S. PATENT DOCUMENTS

| | | | |
|---|---|---|---|
| 6,310,470 B1 | 10/2001 | Hebing et al. | |
| 6,356,068 B1 | 3/2002 | Steiner et al. | |
| 7,709,754 B2 | 5/2010 | Doogue et al. | |
| 8,896,295 B2 | 11/2014 | Friedrich et al. | |
| 11,079,446 B2 * | 8/2021 | Ausserlechner | ....... G01R 15/20 |
| 11,402,409 B1 | 8/2022 | McNally et al. | |
| 11,768,229 B2 | 9/2023 | Boden et al. | |
| 2014/0253108 A1 * | 9/2014 | Singh | .................. G01R 15/181 |
| | | | 324/227 |
| 2023/0221355 A1 | 7/2023 | Liu | |
| 2024/0047314 A1 | 2/2024 | Briano et al. | |
| 2025/0147076 A1 * | 5/2025 | Nakayama | ........... G01R 15/207 |

\* cited by examiner

*Primary Examiner* — Giovanni Astacio-Oquendo
(74) *Attorney, Agent, or Firm* — Daly, Crowley, Mofford & Durkee, LLP

(57) ABSTRACT

A power source connection monitor in redundant power systems determines if valid connections are present to a positive and/or negative terminal of each of the power sources. A current detection integrated circuit serves as an internal tie between redundant control units creating an internal power source bus for each connection between the redundant external connections to each power source. The current detection integrated circuit monitors the current in the internal power source bus interconnections to determine its presence and direction. The current detection integrated circuit signals the control units of failing or failed connections to one or more of the power sources.

32 Claims, 3 Drawing Sheets

SYSTEM AND METHOD TO MONITOR POWER SOURCE CONNECTIONS

FIELD OF TECHNOLOGY

The described technology generally relates to a power source monitor, and more particularly to a current detection integrated circuit for monitoring electrical connections to one or more power sources.

BACKGROUND

Redundant power source systems are used in numerous applications in which a system must continue to operate without interruption should one of the power sources, or a connection to a power source become compromised. In fault detection applications, a current measurement circuit can monitor current flow for fault conditions, e.g., by measuring current in the electrical paths to and from a power source.

SUMMARY

Aspects of the present disclosure relate to a power source connection monitor in redundant power systems that determines if valid connections are present to a positive and/or negative terminal of each of the power sources. A current detection circuit may serve as an internal tie between redundant control units creating an internal power supply bus for each connection, plus and minus, between the redundant external connections to each power source. The current detection circuit may monitor the current in the internal power supply bus interconnections to determine its presence and direction. The current detection circuit may inform the control units of compromised conditions allowing the control units to alter power source operations based on the presence and direction of the current.

According to one aspect, a current sensor integrated circuit (IC) may include a lead frame having first primary current leads, second primary current leads and signal leads. The first primary current leads may form a first primary current path adapted to couple a first terminal of a first power source to a first terminal of a second power source. The second primary current leads may form a second primary current path adapted to couple a second terminal of the first power source and a second terminal of the second power source. A semiconductor die may be supported by the lead frame. At least one first magnetic field sensing element on the semiconductor die may be configured to generate a first magnetic field signal in response to a first magnetic field associated with a first current through the first primary current path. At least one second magnetic field sensing element on the semiconductor die may be configured to generate a second magnetic field signal in response to a second magnetic field associated with a second current through the second primary current path. A current detection circuit on the semiconductor die may be coupled to receive the first and second magnetic field signals. The current detection circuit may be configured to detect a fault in one or more of a plurality of electrical connections between the first primary current path and the first power source, between the first primary current path and the second power source, between the second primary current path and the first power source, or between the second primary current path and the second power source.

The current sensor IC can include one or more of the following features alone or in combination. The first terminal of the first power source and the first terminal of the second power source may be positive terminals, and the second terminal of the first power source and the second terminal of the second power source may be negative terminals. The fault may include a presence of a non-zero current in one or both of the first primary current path or the second primary current path. The current detection circuit may be adapted to determine a direction of the non-zero current. The direction of the non-zero current may indicate a location of the fault with respect to the plurality of electrical connections. The first power source and the second power source may be redundant power sources. The first primary current path and the second primary current path may couple first and second electronic control units (ECUs). The first and second ECUs may be redundant ECUs. The current detection circuit may be configured to receive a first power signal from the first ECU and a second power signal from the second ECU, where the first power signal and the second power signal may be combined to provide redundant power to the current detection circuit upon detecting a fault in one or more of the plurality of electrical connections. Each of the redundant ECUs may comprise a microcontroller, a load circuit, and a power management circuit. The microcontroller of the first ECU may be adapted to cause power to be supplied to the second ECU from the first power source upon detection of the fault in the electrical connection between the first primary current path and the second power source or between the second primary current path and the second power source. The current detection circuit may be configured to generate and transmit a fault signal and a communication signal to the microcontrollers of the first ECU and the second ECU. The fault signal and the communication signal may be output to one of the signal leads. The current detection circuit may be responsive to a first current threshold and a second current threshold, where the fault comprises a partial failure in response to the first current being above the first current threshold and below the second current threshold or the second current being above the first current threshold and below the second current threshold. The partial failure may include at least one of a partial connection loss, a corroded connection, or a corroded conductor. The fault may comprise a total connection loss in response to the first current being above the second current threshold or the second current being above the second current threshold.

According to another aspect, a method of monitoring one or more power sources in a redundant system may include providing a lead frame comprising first primary current leads, second primary current leads and signal leads. The first primary current leads may form a first primary current path adapted to couple a first terminal of a first power source to a first terminal of a second power source. The second primary current leads may form a second primary current path adapted to couple a second terminal of the first power source and a second terminal of the second power source. A semiconductor die supported by the lead frame may be provided. At least one first magnetic field sensing element may be provided on the semiconductor die and configured to generate a first magnetic field signal in response to a first magnetic field associated with a first current through the first primary current path. At least one second magnetic field sensing element may be provided on the semiconductor die and configured to generate a second magnetic field signal in response to a second magnetic field associated with a second current through the second primary current path. A fault may be detected in one or more of a plurality of electrical connections between the first primary current path and the first power source, between the first primary current path and the second power source, between the second primary current path and the first power source, or between the second primary current path and the second power source.

The method for monitoring one or more power sources can include one or more of the following features alone or in combination. The first terminal of the first power source and the first terminal of the second power source may be positive terminals, and the second terminal of the first power source and the second terminal of the second power source may be negative terminals. The fault may comprise a presence of a non-zero current in one or both of the first primary current path or the second primary current path. A direction of the non-zero current may be determined with respect to the plurality of electrical connections. The direction of the non-zero current may indicate a location of the fault. The first power source and the second power source may be redundant power sources. The first primary current path and the second primary current path may couple first and second ECUs. The first and second ECUs may be redundant ECUs. Each of the redundant ECUs may comprise a microcontroller, a load circuit, and a power management circuit. The microcontroller of the first ECU may be adapted to cause power to be supplied to the second ECU from the first power source upon detection of the fault in the electrical connection between the first primary current path and the second power source or between the second primary current path and the second power source. Detecting a fault may comprise detecting a partial failure in response to the first current being above a first current threshold and below a second current threshold or the second current being above the first current threshold and below the second current threshold. The partial failure may comprise at least one of a partial connection loss, a corroded connection, or a corroded conductor. Detecting a fault may comprise detecting a total connection loss in response to the first current being above the first current threshold or the second current being above the first current threshold.

According to another aspect, a power monitoring circuit may include a first power source terminal, a second power source terminal, a third power source terminal and a fourth power source terminal. A first ECU may be coupled to the first power source terminal and the second power source terminal. A second ECU may be coupled to the third power source terminal and the fourth power source terminal. A current sensor IC may couple the first ECU and the second ECU. The current sensor IC may include a lead frame comprising first primary current leads, second primary current leads and signal leads. The first primary current leads may form a first primary current path adapted to couple the first power source terminal to the third power source terminal and the second primary current leads may form a second primary current path adapted to couple the second power source terminal to the fourth power source terminal. A semiconductor die may be supported by the lead frame. At least one first magnetic field sensing element on the semiconductor die may be configured to generate a first magnetic field signal in response to a first magnetic field associated with a first current through the first primary current path. At least one second magnetic field sensing element on the semiconductor die may be configured to generate a second magnetic field signal in response to a second magnetic field associated with a second current through the second primary current path. A current detection circuit on the semiconductor die may be coupled to receive the first and second magnetic field signals. The current detection circuit may be configured to detect a fault in one or more of a plurality of electrical connections between the first primary current path and the first power source terminal, between the first primary current path and the third power source terminal, between the second primary current path and the second power source terminal, or between the second primary current path and the fourth power source terminal.

The power monitoring circuit can include one or more of the following features alone or in combination. The first and second power source terminals and the third and fourth power source terminals, respectively, may be redundant connections to a first power source. The first and second power source terminals may be connected to a first power source, and the third and fourth power source terminals may be connected to a second power source.

BRIEF DESCRIPTION OF THE DRAWINGS

The foregoing features of the disclosure, as well as the disclosure itself may be more fully understood from the following detailed description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

The described technology generally relates to a power source connection monitor in redundant power systems. According to aspects described herein, a current detection integrated circuit (IC) may be used to determine if valid connections are present to the positive and/or negative terminal of each of the redundant power sources. A current detection IC may serve as an internal tie between redundant control units creating an internal power supply bus for each connection, plus and minus, between the redundant external connections to each power source. The current detection IC may monitor the current in the internal power supply bus interconnections to determine its presence and direction and instruct the control units to alter power source operations based on the presence and direction of the current.

Figure 1:
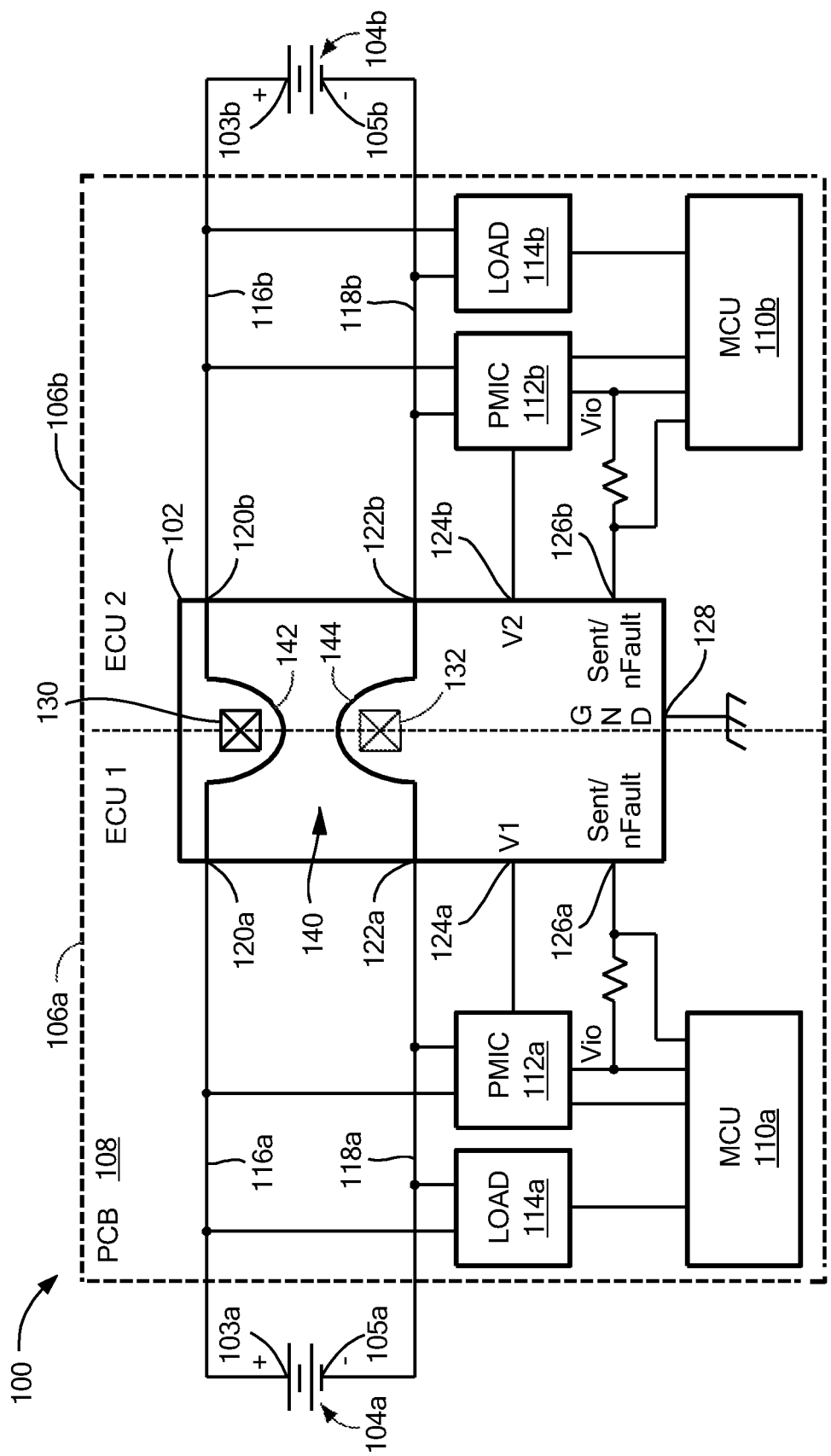
FIG. 1 is a schematic block diagram of an example redundant power source system with a current detection integrated circuit (IC), according to one aspect of the present disclosure.

FIG. 1 is a schematic block diagram of a redundant power source system 100 according to one aspect of the disclosure. The system 100 may include a current detection IC 102 bridging two redundant electronic control units (ECUs) 106a, 106b and their respective power sources 104a, 104b. According to one aspect, each power source 104a, 104b may be a battery, or the like, and may have a positive terminal 103a, 103b connected to a positive supply line 116a, 116b and a negative terminal 105a, 105b connected to a negative supply line 118a, 118b.

Each ECU 106a, 106b may include, for example, a microcontroller unit (MCU) 110a, 110b, a power management integrated circuit (PMIC) 112a, 112b and a load 114a, 114b to be driven. Components of each ECU 106a, 106b are coupled to the positive and negative supply lines of the respective power source 104a, 104b. For example, for ECU 106a, the MCU 110a, PMIC 112a, and load 114a may be coupled to the positive and negative supply lines 116a, 118a of power source 104a and for ECU 106b, the MCU 110b, PMIC 112b, and load 114b may be coupled to the positive and negative supply lines 116b, 118b of power source 104b, as shown. According to one aspect, the ECUs 106a, 106b may be part of, or formed on one or more printed circuit boards 108, or other such substrate.

According to one aspect, the MCUs 110a, 110b may be configured to receive power from one or both of the power sources 104a, 104b through the PMICs 112a, 112b, and energize, operate, drive or otherwise control the loads 114a, 114b. The PMICs 112a, 112b may manage the supplied power on the ECUs 106a, 106b and/or supply an input voltage 124a, 124b, as described below to the current detection IC 102. As described herein, the MCUs 110a, 110b may receive fault signals 126a, 126b from the current detection IC 102, relating, but not limited, to the status of the connections between the ECUs 106a, 106b and the power sources 104a, 104b.

According to one aspect, the current detection IC 102 may be coupled between and internally tie ECUs 106a, 106b together, thereby providing an internal power supply bus 140 for each connection, such as positive supply line 116a, 116b and negative supply line 118a, 118b, between the redundant external connections to the power sources 104a, 104b. The current detection IC 102 may sense the current in the internal power supply bus 140 interconnections to determine the presence and direction of current. According to one aspect, if current is present in the internal power supply bus 140, at least one of the external power connections to that bus 140 may be damaged or lost. According to one aspect, the direction of the current may indicate which connection is faulty.

According to one aspect, current detection IC 102 may include a first current sensor, or sensing element 130 configured to detect a current through a first current path 142, for example between a first current lead 120a and a second current lead 120b, coupling the positive supply lines 116a, 116b. The current detection IC 102 may also include a second current sensor, or sensing element 132 configured to detect a current through a second current path 144, for example between a third current lead 122a and a fourth current lead 122b, coupling the negative supply lines 118a, 118b. As described below in greater detail, the first magnetic field sensing element 130 and the second magnetic field sensing element 132 may detect the presence and direction of a current flow in one or both of the first current path 142 and the second current path 144. Additional circuitry of the current detection IC 102, described below, may encode the detected current information into one or more flags, fault signals, or other communication signals to be sent to the MCUs 110a, 110b. The MCUs 110a, 110b may respond to the information conveyed from the current detection IC 102 to address any failing or failed connection to the power sources 104a, 104b.

While the redundant power source system 100 described above includes two power sources 104a, 104b and two ECUs 106a, 106b, one skilled in the art will recognize that the present disclosure is not limited to such configurations and additional power sources and/or ECUs may be implemented according to the teachings herein without deviating from the scope of the disclosure. Further, one skilled in the art will recognize that the current detection IC 102 may be implemented to monitor redundant connections to a single power source using the concepts and techniques described herein.

Figure 2:
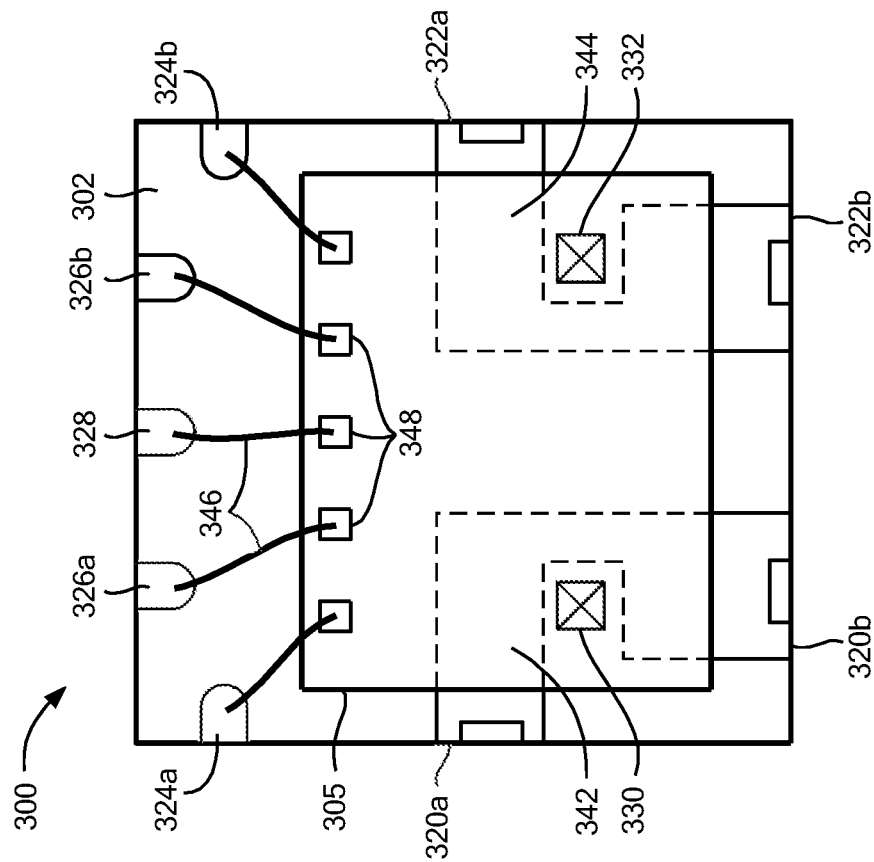
FIG. 2 is a schematic block diagram of the current detection IC of FIG. 1, according to one aspect of the present disclosure.

FIG. 2 is a schematic block diagram of the current detection IC 102 of FIG. 1, according to one aspect of the present disclosure. The current detection IC 102 may include or be part of an IC package featuring a lead frame having multiple primary current leads and signal leads. The lead frame may support a semiconductor die which includes multiple magnetic field sensing elements configured to generate magnetic field signals in response to a magnetic field associated with current flowing through current paths formed in the current detection IC 102.

As shown in FIG. 2, the current detection IC 102 may include first primary current leads 120a, 120b forming a first current path 142. According to one aspect, the first primary current leads 120a, 120b may be coupled to respective terminals of redundant power sources, such as the positive terminals 103a, 103b of power sources 104a, 104b, of FIG. 1. A first magnetic field sensing element 130, such as a Hall effect sensor, may be disposed adjacent to the first current path 142 such that current passing through the first current path 142 may generate a first magnetic field and the first magnetic field sensing element 130 may generate a first magnetic field signal indicative of the current flow through the first current path 142 in response to first magnetic field.

Second primary current leads 122a, 122b may form a second current path 144. The second primary current leads 122a, 122b, may be coupled to respective terminals of redundant power sources, such as negative terminals 105a, 105b of power sources 104a, 104b, of FIG. 1. A second magnetic field sensing element 132, such as a Hall effect sensor, may be disposed adjacent to the second current path 144 such that current passing through the second current path 144 may generate a second magnetic field and the second magnetic field sensing element 132 may generate a second magnetic field signal indicative of the current flow through the second current path 144 in response to second magnetic field.

It will be appreciated by those of ordinary skill in the art that the position of the sensing elements 130, 132 relative to the respective current path 142, 144 is based on the type of sensing element and its axis of maximum sensitivity. For example, sensing elements 130, 132 can be planar Hall effect elements such that with the sensing elements positioned to the side of the respective current path 142, 144, a magnetic field generated by the current has a component perpendicular to the die. In other embodiments, the magnetic field sensing elements may be positioned over the respective current path to sense a magnetic field component parallel to the surface of the die, in which case the sensing elements may be vertical Hall effect elements or magnetoresistance element such as a GMR, TMR or AMR.

It will also be appreciated by those of ordinary skill in the art that the current sensing by magnetic field sensing elements 130, 132, can include one or more individual elements. For example, two sensing elements can be used to sense current in each of the paths 142, 144 in a differential current sensing arrangement.

The first and second magnetic field signals, as analog signals, generated by sensing elements 130, 132 may be processed by respective Hall plate front ends 231, 233 as may include an amplifier and may be digitized by an analog-to-digital converter 136.

The current detection IC 102 may include a control circuit, or processor, 234. Control circuit 234 may include an Arithmetic Logic Unit (ALU), EEPROM, built-in self-test (BIST) circuit, or other elements including flash memory, a controller, and an output protocol circuit with which output signals are generated in a desired format, for example SENT, PC, LIN, SPI or other formats. The current detection IC 102 may further include DC power inputs 124a, 124b connected to respective power sources, for example power sources 104a, 104b of FIG. 1 through a respective PMIC 112a, 112b. According to one aspect, the power for the current detection IC 102 may be received from both power sources 104a, 104b, and logically "OR'd" to ensure that the current detection IC 102 remains powered even if one of the power connections to one of the ECUs 106a, 106b is damaged or lost.

According to one aspect, the control circuit 234 may generate output signals indicative of a faulty connection on secondary leads 126a, 126b for coupling to respective MCUs, such as MCUs 110a, 110b of FIG. 1. According to one aspect, as described herein, fault signals and other communication signals may be transmitted from the same lead 126a, 126b in order to reduce pin count, however one skilled in the art will recognize that separate pins may be used. Other communication signals can take the form of data signals indicating which connection is degraded or has failed and the detected current level.

According to aspects of the disclosure, the current detection IC 102 may monitor the system's connections to redundant power sources. The current detection IC 102 may sense the current in the first current path 142 and the second current path 144 to determine its presence and its direction. The presence in one, or both of the current paths 142, 144 of the current detection IC 102 may be indicative of a compromised or damaged connection to one or more of the power sources. The direction of the current in the current paths may be indicative of which connection is compromised.

For example, and referring back to the redundant power source system 100 of FIG. 1 in which two power sources 104a, 104b supply power to two ECUs 106a, 106b, there may be four connections to the current detection IC 102, for example first positive supply line 116a, second positive supply line 116b, first negative supply line 118a, and second negative supply line 118b. If the current detection IC 102 and magnetic field sensing element 130 detect a current in the first current path 142, and that current is flowing from the second current terminal 120b to the first current terminal 120a, the control circuit (234, FIG. 2) may determine that the connection to the positive terminal 103a of the power source 104a is compromised. The control circuit may output to the MCUs 110a, 110b, a fault flag or other code indicating the compromised connection, and the MCUs 110a, 110b may coordinate or redistribute any electrical connection to ensure appropriate power is supplied to all necessary system components.

Conversely, if the magnetic field sensing element 130 indicates a current flowing in the first current path 142 from the first current terminal 120a to the second current terminal 120b, the control circuit (234, FIG. 2) may determine that the connection to the positive terminal 103b of the power source 104b is compromised. In similar fashion, the control circuit may determine compromised connections on the negative power source connections by detecting a current and its direction in the second current path 144.

According to one aspect, the current detection IC 102 may distinguish between a compromised connection to a power source that is in the process of failing and one that is completely failed or lost. While the direction of a detected current in one of the current paths 142, 144 may indicate which connection is compromised, the magnitude of current may indicate the severity of the damage to the connection. A large current level may indicate a total loss of the connection to the power source terminal, while a lower current may indicate a damaged connection that is still functional, however may lead to a total loss if no action is taken.

According to one aspect, one or more threshold current levels may be set in the control circuit 234 such that, when compared to the detected current level, a current exceeding the threshold levels may indicate either a failing connection or a failed connection. A first threshold may be set such that if the detected current is above the first threshold level, but below a second threshold level, then the connection in question is identified to the MCUs 110a, 100b, as a partial failure. A partial failure may include a partial connection loss, a corroded connection, or a corroded conductor in the power source. The second, higher, threshold may be set such that if the detected current is above the second threshold level, then a total loss of connection may be indicated and a flag sent to the MCUs 110a, 110b.

The threshold levels may be defined according to the applications for which the system 100 is supplying power, as differing applications require different current levels for operation. Additionally, multiple sets of thresholds may be defined and stored in the control circuit memory to be used depending on the operational status of the system, for example if the loads 114a, 114b are active or idle. Accordingly, a first set of threshold values may be defined for a condition when the loads 114a, 114b are active in which current levels in the supply lines are expected to be higher. A second, lower set of threshold values may be defined for a condition when the loads 114a, 114 are idle in which currents in the supply lines are expected to be lower.

For example, a first set of threshold values may correspond to a current of 100 A for a total failure and 1 A for a partial failure. This first set of thresholds may be considered when monitoring the power sources 104a, 104b, when one or more of the loads 114a, 114b are energized. Similarly, a second set of thresholds may be defined at 100 mA for a total failure and 1 mA for a partial failure. The second set of thresholds may be considered when the loads 114a, 114b are in standby (i.e., not energized). Monitoring the status of the power source connections prior to energizing the loads may allow for safe operation of the system and prevent additional failures caused by energizing one or more of the loads 114a, 114b with higher currents over a failed or failing power source connection.

As mentioned above, the control circuit (234, FIG. 2), may send a failure flag (e.g., a failed connection flag or a failing connection flag) along with other data including the current levels in each of the monitored connections including direction as well as flags indicating results of internal diagnostic monitors/self-tests, or the like. This may enable the MCUs 110a, 110b to consider the severity and location of the issue at hand. According to one aspect, the MCUs 110a, 110b may, in the case of a partial failure, monitor the status of the failing connection over time to determine a speed or rate of failure. The MCUs 110a, 110b may use the information to predict when a failing connection may become a failed connection and respond accordingly.

According to one aspect, an example data packet sent from the current detection IC 102 may include one nibble (e.g., half-byte) representing the status of each connection, one nibble representing the status of internal (to the current detection IC) monitors, one byte representing the current level in the first current path 142 (positive supply bus tie), and one byte representing the current level in the second current path 144 (negative supply bus tie). According to one aspect, the data packet may be transmitted or requested by the MCUs 110a, 110b at any time. One skilled in the art will recognize that the preceding data packet protocol is merely exemplary and data may be encoded and transmitted according to any number of protocols.

The current detection IC 102 may transmit the fault and current information in parallel to both MCUs 110a, 110b. According to one aspect, the MCUs 110a, 110b may use the data from the current detection IC 102 to generate an alert that the system requires attention to the failing or failed power source connections.

Figure 3:
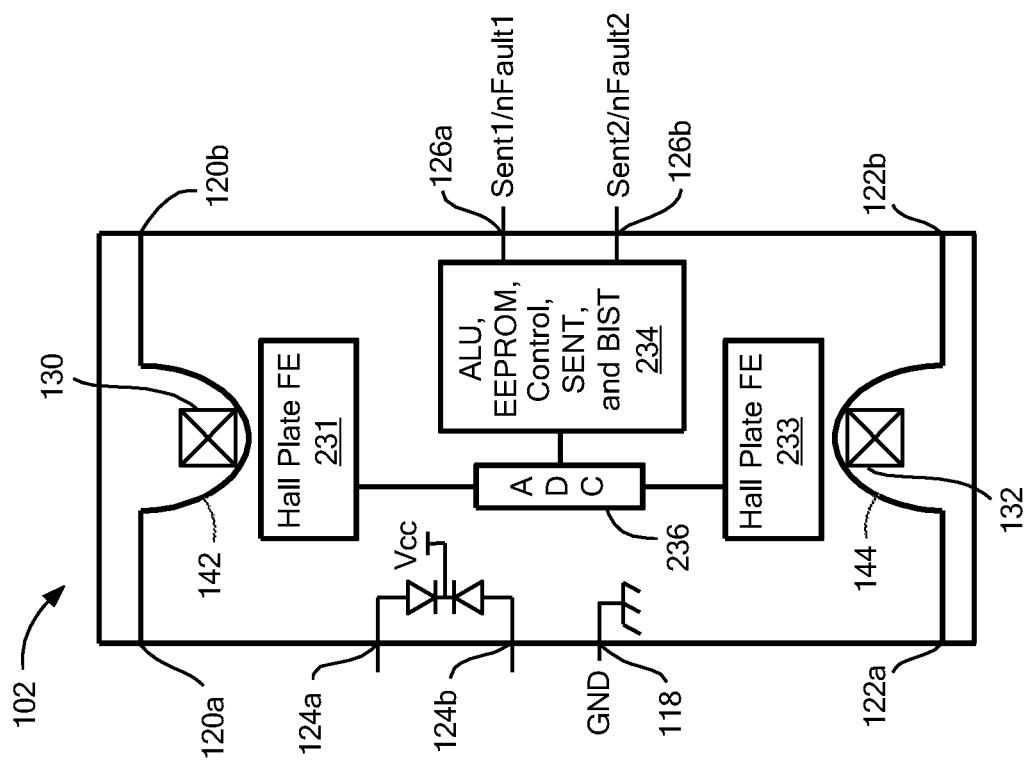
FIG. 3 is a top view of a current detection IC package, according to one aspect of the present disclosure.

FIG. 3 is a top view of a current detection IC package 300, according to one aspect of the present disclosure. The current detection IC package 300 may be or include a current detection IC, as described herein. The current detection IC package 300 may include a package body 302 with an integrated current sensor die 305. The integrated circuit die 305 is attached to a leadframe, or leads, of the package. The die 305 may be attached using, for example, chip on lead, lead on chip, or flip-chip arrangements.

Current lead 320a connected to current lead 320b may form a first primary current path 342. Current lead 322a connected to current lead 322b may form a second primary current path 344. Signal leads 324a, 324b may provide power connections and signal leads 326a, 326b provide output connections (SENT/nFault) as discussed herein. Signal lead 328 may provide a ground connection. Signal leads 324a, 324b, 326a, 326b, 328 may be connected to pads 348 on the die 305 by wire bonds 346. Magnetic field sensing elements 330, 332 may be supported by or disposed within the integrated circuit die 305 and positioned in proximity to the first and second primary current paths 342, 344. While the illustrated package 300 is a DFN package with terminal ends of the leads provided as conductive pads exposed from side and bottom surfaces of the package, it will be appreciated that other package types with other lead configurations are possible.

Figure 4:
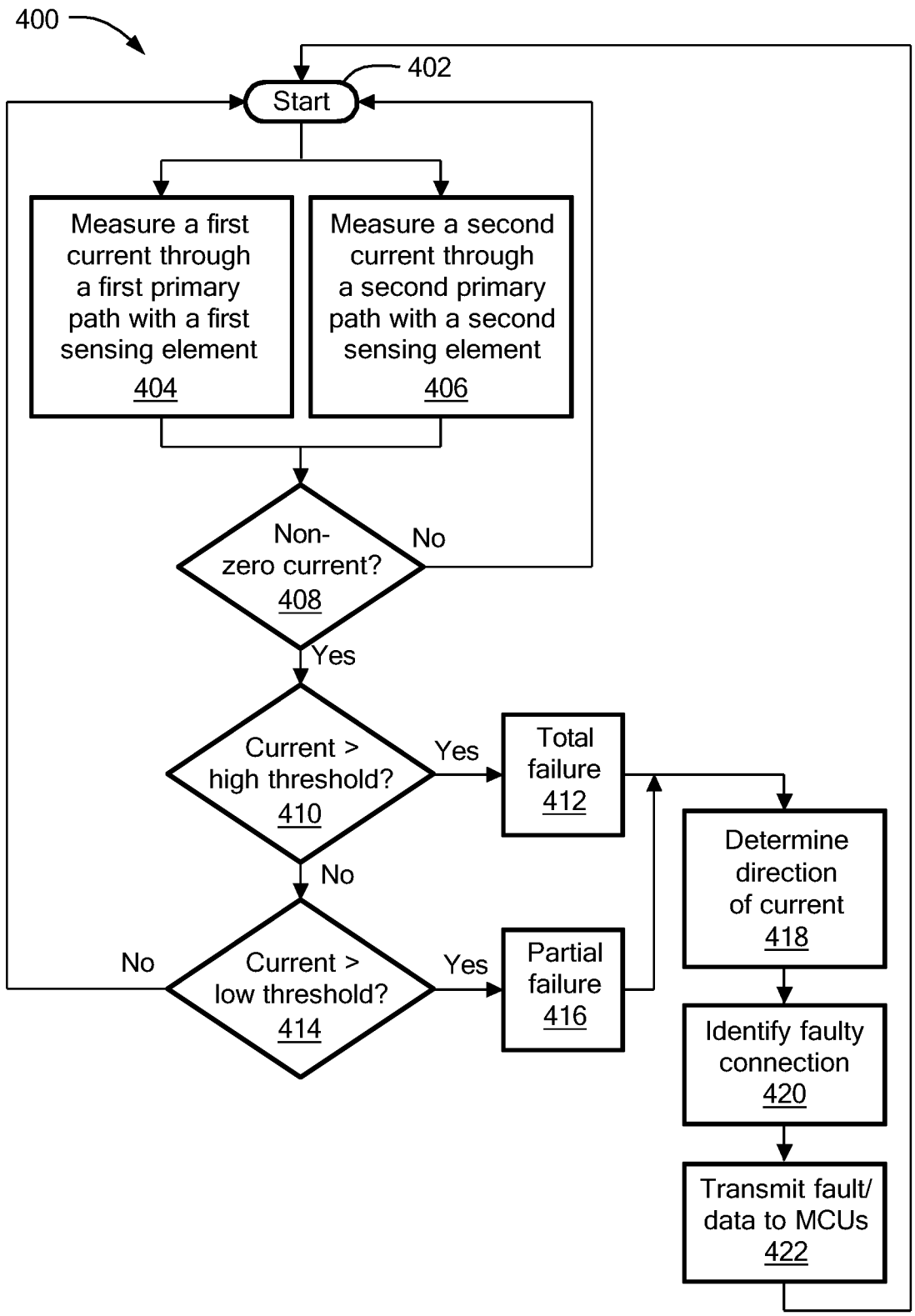
FIG. 4 is a flow diagram of a method of monitoring redundant power sources, according to one aspect of the present disclosure.

Referring now to FIG. 4, a flow chart of a method 400 of monitoring redundant power source connections may start, as shown in block 402 and as described herein, with power supplied to a current detection circuit to monitor and detect current flow to determine whether a faulty power source connection is present in the system. The current detection circuit, receiving power from one or more power sources, may measure with a first sensing element, as shown in block 404, a first current flowing through a first current path. A second current flowing through a second current path may also be measured, shown in block 406, by a second sensing element.

As shown in block 408, if no current is detected, the method 400 may return to the start to continue to monitor and measure current in the first and/or second current paths. If, however, current is present in at least one of the current paths, the current detection IC may compare the detected current to a high threshold level, as shown in block 410. If the detected current level is higher than the high threshold, the current detection IC may indicate a total failure or loss of a power source connection, shown in block 412.

If the detected current is below the high threshold, as shown in block 414, the current detection IC may compare the detected current to a low threshold. If the detected current is greater than the low threshold the current detection IC may indicate a partial failure, shown in block 416, in a power source connection. If the detected current is lower than the low threshold, the current detection IC may determine the minimal amount of current does not rise to the level of a fault and the method 400 may return to the start to continue monitoring.

As shown in block 418, if a partial or total failure is identified based on the magnitude of the detected current, the current detection circuit may determine the direction of the current and, as shown in block 420, may determine the location of the faulty connection. As detailed herein, the presence and direction of the detected current may allow the current detection IC to identify the power source connection that is failing or has failed.

As shown in block 422, the current detection IC may generate a signal to transmit to the MCUs indicating the fault and communicating other data as described herein. The MCUs may process the data from the current detection IC and take action depending on the severity of the fault, its location, and the status of the other system components.

While aspects of the present disclosure describe a redundant power source system with two power sources, one skilled in the art will recognize that any number of power sources may be implemented, including redundant connections to a single power source, without deviating from the scope of the disclosure.

As used herein, the terms "processor" and "controller" are used to describe elements that perform a function, an operation, or a sequence of operations. The function, operation, or sequence of operations can be hard coded into an electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory, in a discrete electronic circuit which can be analog or digital, and/or in special purpose logic circuitry (e.g., a field programmable gate array (FPGA)). Processing can be implemented in hardware, software, or a combination of the two. Processing can be implemented using computer programs executed on programmable computers/machines that include one or more processors, a storage medium or other article of manufacture that is readable by the processor (including volatile and non-volatile memory and/or storage elements), at least one input device and one or more output devices. Program code can be applied to data entered using an input device to perform processing and to generate output information. A processor or controller can contain internal processors or modules that perform portions of the function, operation, or sequence of operations. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

As used herein, the term "magnetic field sensor" or simply "sensor" is used to describe a circuit that uses one or more magnetic field sensing elements, generally in combination with other circuits. The magnetic field sensor can be, for example, a rotation detector, a movement detector, or a proximity detector. A rotation detector (or movement detector) can sense passing target objects, for example, magnetic domains of a ring magnet or a ferromagnetic target (e.g., gear teeth) where the magnetic field sensor is used in combination with a back-bias or other magnet and can determine target movement speed. Ferromagnetic objects described herein can have a variety of forms, including, but not limited to, a ring magnet having one or more pole pair, and a gear having two or more gear teeth. Ferromagnetic gears are used in some examples below to show a rotating ferromagnetic object having ferromagnetic features, i.e., teeth. However, in other embodiments, the gear can be replaced with a ring magnet having at least one pole pair. Also, linear arrangements of ferromagnetic objects are possible that move linearly.

As used herein, the term "magnetic field sensing element" is used to describe a variety of electronic elements that can sense a magnetic field. The magnetic field sensing element can be, but is not limited to, a Hall effect element, a magnetoresistance element, a magnetotransistor, or an inductive coil. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate or in the plane of the substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of maximum sensitivity perpendicular to a substrate, while metal based or metallic magnetoresistance elements (e.g., GMR, TMR, AMR) and vertical Hall elements tend to have axes of maximum sensitivity parallel to a substrate.

As used herein, the term "magnetic field signal" is used to describe any signal that results from a magnetic field experienced by a magnetic field sensing element.

It should be understood that a so-called "comparator" can be comprised of an analog comparator having a two-state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

It is noted that various connections and positional relationships (e.g., over, below, adjacent, etc.) may be used to describe elements and components in the description and drawings. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A current sensor integrated circuit (IC) comprising:
a lead frame comprising first primary current leads, second primary current leads and signal leads, wherein the first primary current leads form a first primary current path adapted to couple a first terminal of a first power source to a first terminal of a second power source and wherein the second primary current leads form a second primary current path adapted to couple a second terminal of the first power source and a second terminal of the second power source;
a semiconductor die supported by the lead frame;
at least one first magnetic field sensing element on the semiconductor die configured to generate a first magnetic field signal in response to a first magnetic field associated with a first current through the first primary current path;
at least one second magnetic field sensing element on the semiconductor die configured to generate a second magnetic field signal in response to a second magnetic field associated with a second current through the second primary current path; and
a current detection circuit on the semiconductor die and coupled to receive the first and second magnetic field signals, wherein the current detection circuit is configured to detect a fault in one or more of a plurality of electrical connections between the first primary current path and the first power source, between the first primary current path and the second power source, between the second primary current path and the first power source, or between the second primary current path and the second power source.

2. The current sensor IC of claim 1 wherein the first terminal of the first power source and the first terminal of the second power source are positive terminals, and wherein the second terminal of the first power source and the second terminal of the second power source are negative terminals.

3. The current sensor IC of claim 1 wherein the fault comprises a presence of a non-zero current in one or both of the first primary current path or the second primary current path.

4. The current sensor IC of claim 3 wherein the current detection circuit is adapted to determine a direction of the non-zero current.

5. The current sensor IC of claim 4 wherein the direction of the non-zero current indicates a location of the fault with respect to the plurality of electrical connections.

6. The current sensor IC of claim 1 wherein the first power source and the second power source are redundant power sources.

7. The current sensor IC of claim 1 wherein the first primary current path and the second primary current path couple first and second electronic control units (ECUs).

8. The current sensor IC of claim 7 wherein the first and second ECUs are redundant ECUs.

9. The current sensor IC of claim 8 wherein the current detection circuit is configured to receive a first power signal from the first ECU and a second power signal from the second ECU, wherein the first power signal and the second power signal are combined to provide redundant power to the current detection circuit upon detecting a fault in one or more of the plurality of electrical connections.

10. The current sensor IC of claim 8 wherein each of the redundant ECUs comprises a microcontroller, a load circuit, and a power management circuit.

11. The current sensor IC of claim 10 wherein the microcontroller of the first ECU is adapted to cause power to be supplied to the second ECU from the first power source upon detection of the fault in the electrical connection between the first primary current path and the second power source or between the second primary current path and the second power source.

12. The current sensor IC of claim 11 wherein the current detection circuit is configured to generate and transmit a fault signal and a communication signal to the microcontrollers of the first ECU and the second ECU.

13. The current sensor IC of claim 12 wherein the fault signal and the communication signal are output to one of the signal leads.

14. The current sensor IC of claim 1 wherein the current detection circuit is responsive to a first current threshold and a second current threshold, and wherein the fault comprises a partial failure in response to the first current being above the first current threshold and below the second current threshold or the second current being above the first current threshold and below the second current threshold.

15. The current sensor IC of claim 14 wherein the partial failure comprises at least one of a partial connection loss, a corroded connection, or a corroded conductor.

16. The current sensor IC of claim 14 wherein the fault comprises a total connection loss in response to the first current being above the second current threshold or the second current being above the second current threshold.

17. A method of monitoring one or more power sources in a redundant system, the method comprising:
providing a lead frame comprising first primary current leads, second primary current leads and signal leads, wherein the first primary current leads form a first primary current path adapted to couple a first terminal of a first power source to a first terminal of a second power source and wherein the second primary current leads form a second primary current path adapted to couple a second terminal of the first power source and a second terminal of the second power source;
providing a semiconductor die supported by the lead frame;
providing at least one first magnetic field sensing element on the semiconductor die configured to generate a first magnetic field signal in response to a first magnetic field associated with a first current through the first primary current path;
providing at least one second magnetic field sensing element on the semiconductor die configured to generate a second magnetic field signal in response to a second magnetic field associated with a second current through the second primary current path; and
detecting a fault in one or more of a plurality of electrical connections between the first primary current path and the first power source, between the first primary current path and the second power source, between the second primary current path and the first power source, or between the second primary current path and the second power source.

18. The method of claim 17 wherein the first terminal of the first power source and the first terminal of the second power source are positive terminals, and wherein the second terminal of the first power source and the second terminal of the second power source are negative terminals.

19. The method of claim 17 wherein the fault comprises a presence of a non-zero current in one or both of the first primary current path or the second primary current path.

20. The method of claim 19 further comprising determining a direction of the non-zero current with respect to the plurality of electrical connections.

21. The method of claim 20 wherein the direction of the non-zero current indicates a location of the fault.

22. The method of claim 17 wherein the first power source and the second power source are redundant power sources.

23. The method of claim 17 wherein the first primary current path and the second primary current path couple first and second electronic control units (ECUs).

24. The method of claim 23 wherein the first and second ECUs are redundant ECUs.

25. The method of claim 24 wherein each of the redundant ECUs comprises a microcontroller, a load circuit, and a power management circuit.

26. The method of claim 25 wherein the microcontroller of the first ECU is adapted to cause power to be supplied to the second ECU from the first power source upon detection of the fault in the electrical connection between the first primary current path and the second power source or between the second primary current path and the second power source.

27. The method of claim 17 wherein detecting a fault comprises detecting a partial failure in response to the first current being above a first current threshold and below a second current threshold or the second current being above the first current threshold and below the second current threshold.

28. The method of claim 27 wherein the partial failure comprises at least one of a partial connection loss, a corroded connection, or a corroded conductor.

29. The method of claim 27 further wherein detecting a fault comprises detecting a total connection loss in response to the first current being above the second current threshold or the second current being above the second current threshold.

30. A power monitoring circuit comprising:
    a first power source terminal and a second power source terminal;
    a third power source terminal and a fourth power source terminal;
    a first electronic control unit (ECU) coupled to the first power source terminal and the second power source terminal;
    a second ECU coupled to the third power source terminal and the fourth power source terminal;
    a current sensor integrated circuit (IC) coupling the first ECU and the second ECU, wherein the current sensor IC comprises:
        a lead frame comprising first primary current leads, second primary current leads and signal leads, wherein the first primary current leads form a first primary current path adapted to couple the first power source terminal to the third power source terminal and wherein the second primary current leads form a second primary current path adapted to couple the second power source terminal to the fourth power source terminal;
        a semiconductor die supported by the lead frame;
        at least one first magnetic field sensing element on the semiconductor die configured to generate a first magnetic field signal in response to a first magnetic field associated with a first current through the first primary current path;
        at least one second magnetic field sensing element on the semiconductor die configured to generate a second magnetic field signal in response to a second magnetic field associated with a second current through the second primary current path; and
        a current detection circuit on the semiconductor die and coupled to receive the first and second magnetic field signals, wherein the current detection circuit is configured to detect a fault in one or more of a plurality of electrical connections between the first primary current path and the first power source terminal, between the first primary current path and the third power source terminal, between the second primary current path and the second power source terminal, or between the second primary current path and the fourth power source terminal.

31. The power monitoring circuit of claim 30 wherein the first and second power source terminals and the third and fourth power source terminals, respectively, are redundant connections to a first power source.

32. The power monitoring circuit of claim 30 wherein the first and second power source terminals are connected to a first power source, and the third and fourth power source terminals are connected to a second power source.

* * * * *